United States Patent Office 3,218,239
Patented Nov. 16, 1965

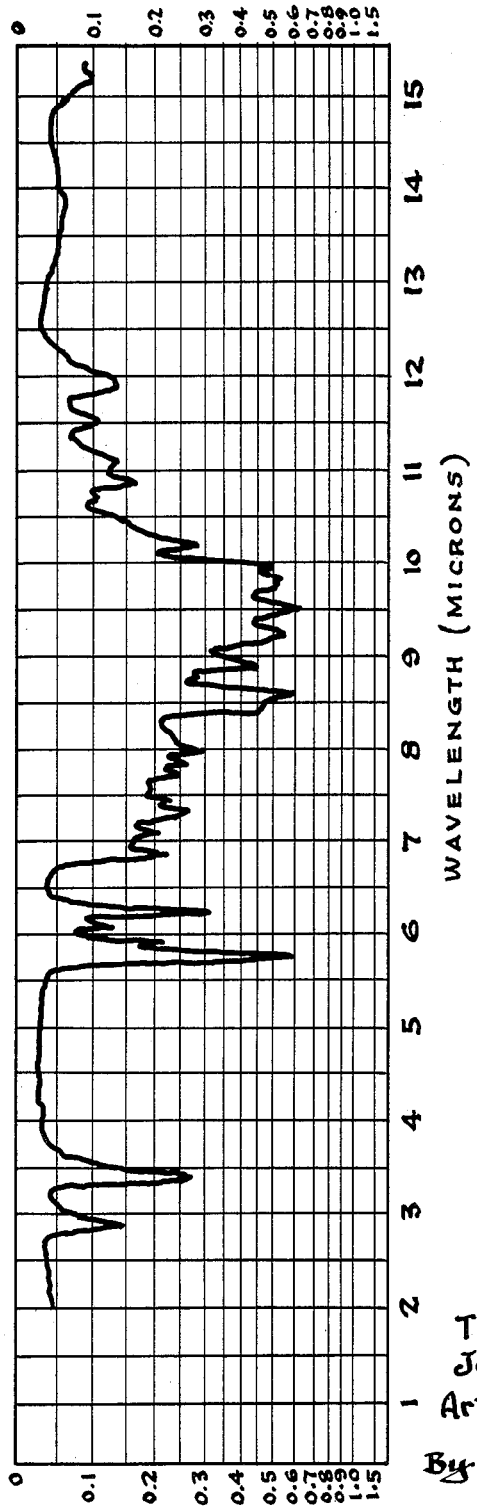

3,218,239
METHOD OF PREPARING ANTIBIOTIC M-188
Earl E. Fager, Lake Villa Township, Lake County, Thomas J. Oliver, Zion, Joseph F. Prokop, Mundelein, and Arthur C. Sinclair, Lake Bluff, Ill., assignors to Abbott Laboratories, North Chicago, Ill., a corporation of Illinois
Filed Mar. 1, 1960, Ser. No. 12,062
4 Claims. (Cl. 195—80)

This invention relates to novel compounds possessing antimicrobial properties and to a process for the preparation thereof. More particularly, the invention relates to a novel composition of matter identified herein as antimicrobial agent M-188, to a process for its production by fermentation, to a method for its recovery and concentration from crude solutions including the fermentation broths, to its purification, and to its acid-addition salts and the production thereof.

It is an object of the present invention to provide a new and useful antimicrobial agent which is active against a variety of bacteria and protozoan organisms, as for example, *Eimeria tenella*. Another object of this invention is to provide acid-addition salts of this antimicrobial agent. A further object is to provide a process for the production and recovery of our novel antimicrobial agent. Other objects and features of the invention will become apparent to those skilled in the art to which this invention pertains after reading the following specification and appended claims.

It has been found that by cultivating under controlled conditions and on suitable culture media a hitherto undescribed strain of the microorganism *Streptomyces caelestis*, a novel composition of matter herein identified as antimicrobial agent M-188 is obtained. The microorganism strain was isolated from a soil sample collected in Crystal City, Texas. In its morphological characteristics, the organism appears to be most closely related to the known *Streptomyces caelestis*. As will be set forth hereinafter, there are certain differences in the cultural properties of the known organism and those of the novel isolate of this invention. We have, therefore, classed the isolate of this invention as a strain of *Streptomyces caelestis*. A culture of the living organism has been deposited with the Northern Utilization Research and Development Division of the Agricultural Research Service, United States Department of Agriculture at Peoria, Illinois and has been added to its permanent collection as NRRL 2821.

A careful study of the morphology and physiology of our new strain of *Streptomyces caelestis* shows that it can be distinguished from *Streptomyces caelestis*, the latter of which is completely described in British Patent 768,971. It has been found that xylose, arabinose, rhamnose, dextrose, galactose, mannose, fructose, sucrose, lactose, maltose, cellobiose, dextrin, raffinose, glycerol and sodium succinate are all readily utilized by both organisms. Sorbose, dulcitol, sodium potassium tartrate and soluble starch are not utilized by either organism. On the other hand, however, sorbitol, sodium citrate and salicin are utilized by *Streptomyces caelestis*, strain M-188 but are not utilized by *Streptomyces caelestis*. The utilization of the various carbon compounds enumerated above by our new strain of microorganism was determined by the procedure of Pridham and Gottlieb, Journal of Bacteriology 56, 107–114 (1948). By direct comparison light microscopy, the sporulating mycelium and spores of both organisms were indistinguishable.

Other direct comparisons from Pridham's medium with various carbon sources show that the color of the sporulating aerial mycelium of *Streptomyces caelestis*, strain M-188 is greenish blue as compared to the caelestial blue color produced by *Streptomyces caelestis*. When compared with *Streptomyces caelestis*, the following similarities and differences between it and *Streptomyces caelestis*, strain M-188 were noted:

| Basal medium | Characters compared | Streptomyces caelestis strain, M-188 | Streptomyces caelestis |
|---|---|---|---|
| Gelatin | Growth | Fair | Good. |
|  | Aerial | Oyster white | Blue-gray. |
|  | Pigment | Dark brownish black. | Brown. |
|  | Liquefaction | Negative | To depth of pigment. |
| Milk | Growth | Fair | Good. |
|  | Coagulation | None | None. |
|  | Peptonization | do | Do. |
|  | Reduction | do | Do. |
| D-glucose nutrient broth | Growth | Fair-Good | Good. |
|  | Aerial | None | None. |
|  | Pigment | do | Tan. |
| Nutrient agar | Growth | Good | Fair-good. |
|  | Aerial | Ivory tint, pearl shell tint. | Slight pink, white. |
|  | Soluble pigment | None | Brown-tan. |
| D-glucose agar | Growth | Good | Good. |
|  | Aerial | None | Blue-gray, white. |
|  | Soluble pigment | None | Tan. |
| Waksman's tyrosine agar | Growth | Fair-good | Good. |
|  | Aerial | None | None. |
|  | Pigment | do | Do. |
| Waksman's starch agar B | Growth | None | None. |
| Nitrite from nitrate |  | Negative | Negative. |

Although *Streptomyces caelestis* sporulates more readily on organic media than *Streptomyces caelestis*, strain M-188, this is believed to be a strain difference. It has been established that these two organisms produce separate and distinct antimicrobial agents.

A complete taxonomic study of *Streptomyces caelestis*, strain M-188 in various mediums is shown below wherein the color code references used are in accordance with "Color Harmony Manual," 3rd Edition, Jacobsen, Granville and Foss, 1948, Container Corporation of America.

MEDIUM NO. 1—TRYPTONE, GLUCOSE, BEEF EXTRACT AGAR

Growth on this medium is rapid and abundant. The darkest substratal color day 6 is mustard brown (2 *pl*). By day 11 the lighter substratum is golden brown, tobacco brown (3 *pi*), the darker areas, centers of crowded colonies, clove brown (3 *ni*). By 18 days these areas were respectively camel, maple sugar, tan (3 *ie*) and clove brown, deep brown (3 *pl*).

Aerial is abundant, covering the surface of 2 to 3 mm. colonies at 3 days and in central portion of other larger colonies. Aerial color oyster white (*b*) to light gray (*c*) unchanged through 26 days of incubation. Microscopic examination of aerial day 26—no spores.

Isolated colonies have convex centers with aerial confined to central 1 to 2 mm. At 6 to 11 days a single diametric wrinkle or fissure shows in the central raised portion. As growth proceeds colonies spread flatly with 2 to 4 mm. surface growth, remainder spreading densely under agar surface to a total diameter of 7 to 7.5 mm. at 18 days. Aerial remains confined to original area noted at 3 days.

Soluble pigment brownish day 3, moderate clove brown (3 *ni*) day 6 becoming chocolate, dark brown (4 *nl*) by 18 days.

MEDIUM NO. 2—PEPTONE, GLUCOSE, SODIUM CHLORIDE, BEEF EXTRACT AGAR

Very rapid and abundant growth—substratum mustard, old gold (2 *le*) 6 days—deeper colored portions 11 days amber, topaz (3 *pe*)—golden brown (3 *pg*) 18 days with newer growth in extending colonies mustard, old gold (2 *le*).

Aerial, sparse to moderate only in regions of crowded growth, is pearl, shell tint (2 *ba*) 6 days becoming yellow tint (1 *ba*) 11 days. Microscopic examination showed no spores day 27.

Isolated colonies by 6 days have heaped up, radially wrinkled centers. At 18 days some radial indentations extend to within ½ mm. of edge of colonies. Isolated colonies 2¼ mm. 3 days reach 8–11 mm. 18 days. Viewed from above surface of isolated colonies light mustard tan (2 *ie*) except centers which are drying and collapsing cream (1½ *ca*).

A very light brownish soluble pigment 3–11 days becomes light diffuse greenish brown by day 18.

MEDIUM NO. 3—NUTRIENT AGAR

Excellent growth. Aerial moderate to abundant covering 2.0 mm. colonies day 3 but not increasing as growth extends to 4–6 mm. day 11. Aerial color oyster white (*b*) to pearl, shell tint (2 *ba*) to ivory tint (2 *cb*) as incubation progresses. No spores observed by microscopic examination at 11, 18, 27 days.

Well isolated colonies 6–11 days, 4–6 mm. diameter, with radial wrinkling and a single, more prominent, diametric fissure confined principally to 2.0 mm. raised aerial bearing central portion. Remainder of growth extends flatly over agar surface to a well-defined edge. Growth does not extend into agar beyond limits of surface growth.

Darker substratum clove brown, deep brown (3 *pl*) to dark brown, coffee, sepia brown, seal brown (3 *pn*) at 6–11 days, becoming clove brown (3 *ni*) at 18 days. Lighter substratum under non-aerial portions adobe brown, light brown, cinnamon brown (3 *lg*) at 11 days changes to yellow maple (3 *ng*) at 18 days.

Soluble pigment deep brown, clove brown (3 *pl*) 6 days is deep brown (4 *pl*) 11 days and diffuse mustard brown (2 *pi*) 18 days.

MEDIUM NO. 4—GLUCOSE AGAR

Growth on this medium is rapid and abundant. No aerial is produced through 27 days incubation and no soluble pigment was observed.

2.0 mm. smooth dull colonies at 3 days become flatly spreading at 6 days to 4 to 4½ mm. with symmetrical radial fissures or indentations wrinkling the raised central portion. As growth proceeds it does not spread beneath agar surface as in other organic media with less glucose.

Substratal color in darker colony centers is mustard, old gold (2 *le*) at 6 days, not changing thereafter. Lighter substratum of new extending growth is bamboo, chamois (2 *gc*).

MEDIUM NO. 5—CARVAJAL OATMEAL AGAR

No growth occurred on this medium through 27 days incubation.

MEDIUM NO. 6—CZAPEK'S SOLUTION, DEXTROSE, AGAR

Growth slow to start with pinpoint colonies at 3 days, advancing to 7.0 mm. isolated colonies by 18 days. Sparse yellow tint (1 *ba*) aerial at 6 days observed in central popillae of 1 to 1½ mm. colonies. At 11 days pearl, shell tint aerial (2 *bc*) is located as a sparse ring around non-aerial, central portion. From above, this non-aerial center is mustard, old gold (2 *le*). Substratum of streak and colony centers 11 days is parchment (1½ *db*). At 18 days surface growth of colonies is approximately 3.0 mm., remainder spreading underneath agar surface to 7.0 mm.

No soluble pigment produced in 27 days.

Microscopic examination—no spores 27 days.

MEDIUM NO. 6c—CZAPEK'S SOLUTION, CORN STARCH, AGAR

Three days—moderate colorless growth in streak. Isolated colonies feathery 1½ to 2.0 mm. No hydrolysis noted. Six days—growth remains colorless. Isolated colonies 3.0 to 3½ mm. Partial hydrolysis of 2.0 mm. questionable near heavy growth streak. Eleven days—questionable hydrolysis—turbid halo around growth with small zone of partial clearing beyond. Eighteen days—many colonies with abundant green to bluish green aerial—spores—isolated colonies spread densely into agar 2.0 mm. beyond surface growth. Typical measurement: diameter surface growth 9.0 mm., below agar to 11.0 mm., cloudy halo to 15 mm., and faint to moderate hydrolysis to 22.0 mm. Zone of clearing judged against control portion of agar, not against cloudy inner halo.

MEDIUM NO. 7—DEXTROSE, ASPARAGINE AGAR

Growth is moderate to good on this medium. Most heavily pigmented substratum at 6 days parchment (1½ *db*). This remains deepest color obtained by central portions of isolated colonies. Newer growth shows substratal yellow tint (1 *ba*) to colorless as edge of extending growth is approached. Aerial moderate yellow tint (1 *ba*) to oyster white (*b*). No soluble pigment or spores noted after 27 days incubation.

MEDIUM NO. 8—CALCIUM MALATE AGAR

Growth is excellent and digestion of malate good to marked. At 3 days, colonies all of which were isolated even in closely crowded streak, consisted of 2.0 mm. flat filmy type non-aerial estimated at >95% of growth. The remainder of smaller colonies had aerial. At 6 days clearing of malate faintly noted. All colonies now have aerial yellow tint (1*ba*) except few spots of almond green (23 *ig*). It was not noted whether the green aerial colonies were those which first appeared with aerial at 3 days. At 11 days, digestion is marked 5–6 mm. from edge of streak and former green aerial now is dark gray to slate colored. At 18 days the bulk of aerial is oyster white (*b*) to light ivory, eggshell (2 *ca*), and at 27 days there are abundant new, green, aerial colonies in the streak.

Microscopic examination of green aerial—profuse sporulation.

MEDIUM NO. 9—L-TYROSINE AGAR SLANTS

No soluble pigment formed by numerous isolated colonies which developed slowly at first but adequately as incubation progressed through 27 days.

MEDIUM NO. 10a—STARCH AGAR NO. 1 WITH CORN STARCH

Three days—no visible growth.
Six days—one colony.
Eleven days—one colony.
Eighteen days—9.0 mm. colony with 5 radial indentations. Zone of hydrolysis 13.0 mm. diameter.
Twenty-seven days—colony 19.0 mm.—hydrolysis 34 mm.

MEDIUM NO. 11—TRYPTOSE, BLOOD AGAR

Abundant dull, dry, non-aerial growth, no hemolysis through 18 days of incubation. A heavy dark, almost black, discoloration of surrounding medium occurs adjacent to growth within 3 days. Intact red cells can be found upon close observation.

MEDIUM NO. 13—GELATIN PLUG

Growth is not visible at 3 days but is good by day 6 with sparse oyster white (b) aerial and moderate to abundant ebony, teak (3 po) soluble pigment below surface pellicle. At 18 days, pellicle is heavy and soluble pigment deep brown. Gelatin is not liquefied through 27 days of incubation.

MEDIUM NO. 14—POTATO WEDGE

Growth is good to excellent after slow start. At 6 days, majority of growth consists of numerous, dry, heaped-up colonies with no aerial. A scant aerial is present at thin upper portion of slant. Wrinkling of colonies day 11 consists of numerous fine radial fissures or indentations. Non-aerial growth adobe brown, cinnamon brown, light brown (3 lg) day 6 becoming golden brown, tobacco brown (3 pi) to deep brown, clove brown (3 pl) day 11. The scant aerial at top of slant is ivory (2 db). There is only moderate darkening of potato through 27 days of incubation.

MEDIUM NO. 15—GLUCOSE BROTH

With the inoculum used, all growth in this medium consisted of separate colonies, subsurface, clinging to sides and on bottom of tube. By day 11, colonies at sides showed heavy and light portions radiating from a dense center, typical of radial wrinkling on favorable solid media. All growth on bottom of tube day 18. No pellicle formed, hence no aerial or note of substratal pigment. Growth was colorless. No soluble pigment was observed.

MEDIUM NO. 16—CZAPEK'S SOLUTION WITH DEXTROSE

No growth occurred during 27 days of incubation.

MEDIUM NO. 17—LITMUS MILK

Growth consisted of partial pellicle. On day 11 this was noted as two large, wrinkled colonies. Tube was shaken thoroughly to distribute growth. By day 18, no visible change had occurred. After 27 days, there was no coagulation or peptonization. Final pH day 27 was 5.7.

MEDIUM NO. 18—YEAST EXTRACT MALTOSE AGAR

Growth abundant and rapid on this medium. Isolated colonies non-aerial. Moderate aerial in crowded growth regions oyster white (b). No spores observed by microscopic examination of aerial days 11, 18, 27.

Substratal color bamboo, chamois (2 gc) day 6 becomes honey gold, light gold (2 ic) day 11 and golden brown aproximately (3 pg) day 11. Well isolated colonies non-aerial 4–5 mm. day 6, convex with numerous symmetrical radial fissures or wrinkles. These reach 8.0 mm. by day 11 with flatly spreading outer portion. Central raised portion radially fissured converging in small central pit or depression. Growth at colony edges did not extend into agar beyond surface growth. No soluble pigment was observed.

MEDIUM NO. 19—TOMATO PASTE, OATMEAL AGAR

Growth rapid and abundant. Oyster white (b) aerial is plentiful in crowded growth regions at 3 days. Isolated colonies typical of those described for other organic media. At 18 days, aerial on isolated colonies appears in patches or as thin ring around raised, radially wrinkled and convoluted non-aerial center. In crowded growth regions, aerial appears in center of colonies on covering colonies in most crowded portions. No change was observed in color of surrounding medium. Aerial did not assume green color during 27 days incubation. Microscopic examination of aerial after 27 days—no spores. Maximum isolated colony size 27 days 21.0 mm.

MORPHOLOGY OF SPORES—MEDIUM, PRIDHAM AND GOTTLIEB BASAL WITH DEXTRIN AS THE CARBON SOURCE

Spores measuring approximately $0.8\mu \times 1.0\mu$ are borne in individual chains which are flexuous, to loops, coils and primitive spirals. No true spirals have been observed. The chains generally appear as tufts at the ends of mycelial filaments or short branches of mycelium but occasionally as single chains from a primary branch. The tufts are produced by several chains arising by closely proximate branching and rebranching of mycelium rather than as brushed from a single origin.

Electron micrographs show mature spores to be covered with numerous ridges and blunt spines. Young spores are relatively smooth. Some of these appear to be binucleate. The ovoid to bacillary morphology described by measurements given above is borne out by electron micrographs.

The present invention as previously stated also embraces a process for growing *Streptomyces caelestis*, strain M-188 under controlled conditions which include a temperature of 24–32° C., submerged fermentation with suitable agitation and aeration using media consisting of a carbohydrate source such as glycerol, starch, dextrin, or the sugars glucose, lactose, or sucrose or combinations of these carbohydrate sources; a source of organic nitrogen such as soybean meal, corn steep liquor, or peptone, a source of growth substances such as yeast, distillers solubles, or molasses; mineral salts such as sodium chloride; an insoluble buffering agent to prevent the accumulation of acid such as calcium carbonate and a non-toxic defoaming agent such as a vegetable oil. When the growth of the organism has produced a satisfactory amount of antimicrobial substance as indicated by assay with the *Bacillus subtilis* assay, the whole culture is processed to recover the desired antimicrobial product. The amount of active substance present in the liquid phase is dependent on pH since the antimicrobial product is a weak base of low solubility in water. Antibacterial assays performed on the filtered or centrifuged beer are therefore not able to measure the total activity produced. It is necessary to carry out an acid treatment of the whole culture prior to performing an assay. The major portion of the antimicrobial product in a good fermentation will be found in the beer solids. The antimicrobial substance is therefore more efficiently extracted from the whole culture rather than the filtrate or liquid portion. A solvent extraction process is used taking advantage of the low solubility of the substance in water under alkaline conditions and the high solubility of the substance in water under acid conditions. The procedures involved are more fully described and illustrated in the examples. A specific substance, thus obtained, possesses unique and valuable properties. It possesses characteristics which distinguish it from known and previously described antimicrobial substances.

Inoculum suitable for use in shaken flasks can be obtained by using the growth from tryptone agar slants. This medium can also be used to maintain by transfer from slant to slant, suitable viable cultures which produce the antimicrobial product. However, in general practice the maintenance of the M-188 culture in soil or under lyophilization has proven a more dependable procedure. The growth on slants is used to inoculate shaken flasks which in turn may be used to inoculate research-scale fermentors. An alternate procedure is to use the shaken flasks to inoculate suitable metal vessels, preferably aluminum, containing an appropriate medium which is used to inoculate pilot-scale fermentors or the seed tanks of commercial-scale fermentors. In general, the growth of the organism in fermentors ranging from 23 liters to 38,000 liters in size reaches its maximum in 3 to 4 days, although for purposes of producing inoculum the incubation may be as short as 24 hours. Aerobic conditions are maintained in the fermentors by forcing sterile air through a dispersing device in the bottom of the fermentor. The rate of air forced into the culture medium is dependent somewhat upon the size and shape of the fermentation vessel. An aeration rate of 4/5 volume to one volume of air per volume of culture per minute has proved satisfactory. If foaming of the culture medium during fermentation becomes a problem, non-toxic antifoaming vegetable oils may be added in sufficient quantity to dispel the foam. Throughout the fermentation period the culture medium is agitated. However, in one phase of inoculum preparation where the yield of antimicrobial agent in the inoculum itself is not of major importance, sufficient agitation is achieved by bubbling air through the liquid. In contrast when the yield of antimicrobial agent is important, agitation is accomplished by stirring devices which are part of the fermentation units. The degree of agitation is dependent upon the design of the varied sized fermentation vessels since it is well understood that pilot and commercial sized fermentation tanks are designed for general usage rather than for a specific fermentation process. The organism Streptomyces caelestis, strain M-188, is able to produce the desired antimicrobial agent in satisfactory amounts in a variety of culture media, over a temperature range of at least 24–32° C. and it is not necessary to maintain an exact aeration rate or a precise amount of mechanical agitation.

The following examples illustrate the formation, recovery, concentration, purification, and identification of antimicrobial agent M-188 and acid-addition salts thereof. These examples are merely illustrative in nature and are not to be construed as limiting.

*Example 1*

PRODUCTION IN 23-LITER FERMENTORS WITH A MOLASSES-PEPTONE MEDIUM

To a 500 ml. Erlenmeyer flask is added 150 ml. of a seed medium containing the following ingredients in the concentrations given:

| | Grams per liter |
|---|---|
| Glucose monohydrate | 15 |
| Soya-fluff flour (finely ground defatted soybean meal) | 15 |
| Sodium chloride | 5 |
| Tap water to one liter. | |

The flask and its contents are sterilized by autoclaving for a period of 25 to 30 minutes at a temperature of 120° C. After cooling, the flask is inoculated with a section from the surface of a tryptone agar slant on which Streptomyces caelestis, strain M-188, has been growing for at least 6 days. The inoculated flask is agitated at 28° C. on a rotary shaker having a stroke of 2¼ inches and operating at about 230 r.p.m. for a period of 48 hours. A second passage seed is prepared by using the above culture to inoculate additional flasks prepared and sterilized as above. Each flask is inoculated with about 3 ml. of the 48-hour culture. The seed flasks are incubated and agitated as above for 48 hours.

To a small fermentor of 23-liter capacity is added 12 liters of a medium constituted as follows:

| | Grams per liter |
|---|---|
| Glucose monohydrate | 10 |
| Molasses | 20 |
| Peptone | 5 |
| Antifoam oil | 5 |
| Tap water to one liter. | |

The fermentor and its contents are sterilized by autoclaving for 75 minutes at 121° C. After cooling, the fermentor is inoculated aseptically with the contents of three of the above-described flasks of second passage seed culture. The culture is grown in the tank at 24° C. for 4 days during which time the broth is stirred mechanically and sterile air is passed into the bottom of the tank at the rate of about 0.8 volume of air per volume of broth per minute. During the fermentation, the pH drops from about 6.0 to about 5.0 and then rises to about 5.5. The maximum biological activity is reached after about 4 days. The presence of the antimicrobial product in the beer is indicated by an inhibition zone of 24 mm. on a plate seeded with Bacillus subtilis.

*Example 2*

PRODUCTION IN 23-LITER FERMENTORS WITH A SOYBEAN MEAL-DRIED DISTILLERS SOLUBLES MEDIUM

In a fermentation tank of 23 liters capacity is placed 12 liters of a fermentation medium having the following composition:

| | Grams per liter |
|---|---|
| Glucose monohydrate | 15 |
| Soybean meal | 12 |
| Sodium chloride | 5 |
| Dried distillers solubles from molasses fermentation | 5 |
| Glycerol | 2.5 |
| Calcium carbonate | 1 |
| Tap water to one liter. | |

About 300 ml. of trans-esterified vegetable oil is added to the tank and the tank and its contents are autoclaved at 121° C. for 75 minutes. After cooling, the fermentor is inoculated aseptically with three flasks of second passage seed as described in Example 1. The culture is grown for 4 days at 28° C. during which time it is stirred mechanically and sterile air is passed into the bottom of the tank at the rate of about 10 liters per minute. During this growth period, the pH of the broth rises slowly from about 6.2 to about 7.4. The antibacterial activity as measured by a plate assay against Bacillus subtilis reaches a maximum at about 3 to 4 days. An inhibition zone of 25 mm. is obtained. After 4 days the culture liquid is removed from the tank and filtered by suction using a filter aid. Because of the low solubility of the antibacterial substance in water, especially at neutral or slightly alkaline pH, the filter cake as well as the liquid phase must be processed to recover the desired material as described in Example 9.

*Example 3*

PRODUCTION IN 23-LITER FERMENTORS WITH A SOYBEAN MEAL-DRIED DISTILLERS SOLUBLES MEDIUM USING A VARIETY OF COMPOUNDS AS THE CARBON SOURCE

The same medium used in Example 2 with the exception of the carbohydrate source is employed for a series of 23-liter fermentors. Two fermentors, each containing 12 liters of medium, are prepared with each of the following carbohydrates: glucose monohydrate, sucrose, lactose, starch, dextrin, and glycerol. These 12 fermentors are prepared as described in Example 2, each set of two containing 17.5 grams per liter of the desired carbohydrate in place of the 15 grams of glucose monohydrate and 2.5 grams of glycerol. The fermentation process for each fermentor is carried out precisely as given in Example 2.

The antimicrobial product is produced with all six culture media. The antibacterial activity as measured by a plate assay against *Bacillus subtilis* shows no one medium clearly better than any of the others. All six media give inhibition zones ranging from 24 to 27 mm. on the last 2 days of the 4-day fermentation.

At the completion of the 4-day fermentation, the entire contents of 11 of the 12 fermentors are pooled and filtered by suction using a filter aid. Because of the low solubility of the antibacterial substance in water, especially under slightly alkaline conditions, the filter cake as well as the liquid phase must be processed to recover the active antimicrobial material as described in Example 9.

*Example 4*

PRODUCTION IN 23-LITER FERMENTORS WITH A SOYBEAN MEAL-CORN STEEP MEDIUM

Twelve liters of a fermentation medium having the following composition are placed in a fermentor with a capacity of 23 liters:

| | Grams per liter |
|---|---|
| Glucose monohydrate | 30 |
| Soybean meal | 20 |
| Corn steep (wet weight) | 10 |
| Sodium chloride | 5 |
| Calcium carbonate | 2 |
| Trans-esterified vegetable oil | 5 | pH adjusted to 6.6 to 6.8 with $Na_2CO_3$.

The fermentor and its contents are autoclaved at 121° C. for 75 minutes. After cooling, the fermentor is inoculated aseptically with three flasks of second passage seed as described in Example 1. The organism is grown for 4 days at 28° C. during which time the culture is stirred mechanically and sterile air is passed into the bottom of each tank at the rate of about 10 liters per minute. During the growth period, the pH of the medium rises slowly after an early drop to 6.2–6.4 to about 7.6 at harvest. The antibacterial activity as measured by the plate assay against *Bacillus subtilis* reaches its peak on the third or fourth day of fermentation. Since there is no apparent drop off in yields once the peak is reached, the fermentation is harvested on the fourth day to insure maximum production. Inhibition zones of 26 mm. are produced on the *Bacillus subtilis* assay plate.

*Example 5*

PRODUCTION IN 190-LITER FERMENTORS WITH A SOYBEAN MEAL, CORN-STEEP LIQUOR, YEAST MEDIUM

The organism *Streptomyces caelestis*, strain M-188, is grown on tryptone agar slants for 6 days at 28° C. The growth from an agar slant is suspended in a few milliliters of water and two 500-ml. Erlenmeyer flasks containing 150 ml. each of the following seed medium are inoculated:

| | Grams per liter |
|---|---|
| Glucose monohydrate | 15 |
| Soya-fluff flour | 15 |
| Sodium chloride | 5 |
| Calcium carbonate | 1 |

The flasks containing 150 ml. of this medium are sterilized by autoclaving for a period of 25 to 30 minutes at 120° C. After cooling, the flasks are inoculated with the growth from the agar cultures as just described. The inoculated flasks are agitated at 28° C. for 48 hours on a rotary shaker having an eccentric of 2¼ inches. The entire contents of these flasks are inoculated into a metal aerated bottle of approximately 12 liter capacity containing 10 liters of the following medium:

| | Grams per liter |
|---|---|
| Soybean meal | 10 |
| Glucose monohydrate | 10 |
| Calcium carbonate | 1 |
| Trans-esterified vegetable oil | 5 |

The vessel and its contents were previously sterilized for 80 minutes at 120° C. and cooled to 28° C.

The aerated bottles are incubated at 28° C. for 48 hours. Air is bubbled through the culture medium from a tube at the bottom at the rate of approximately 10 liters per minute. The entire contents of the bottle are then used to inoculate a fermentor of 190 liters capacity containing 115 liters of the following medium which had been previously sterilized at 124° C. for one hour and cooled to 32° C.:

| | Grams per liter |
|---|---|
| Starch | 10 |
| Soybean meal | 20 |
| Corn steep liquor (wet weight) | 10 |
| Whole dried brewer's yeast | 5 |
| Calcium carbonate | 3 |
| Trans-esterified vegetable oil | 30 |

The inoculated medium in the fermentor is maintained under vigorous agitation at a temperature of 32° C. for 4 days while aerating at a rate of one volume per volume of medium per minute. At the end of the fermentation, the growth is often so heavy that it is necessary to dilute the culture with water in order to pump it from the fermentation vessel.

Assays on untreated culture are of little or no value in determining the potency of the culture at harvest because of the insolubility of the antimicrobial product. With the following treatment of the cultures, assays become more useful. Fifty ml. of whole culture are adjusted to pH 2.0 with hydrochloric acid and this acidified culture is then placed on the rotary shaker for 30 minutes. This is followed by vacuum filtration through three pads of Whatman #1 filter paper. This filtrate after adjustment to pH 4.0 with sodium hydroxide is ready for assay. The assay on the fermentation described in this example was 225 units per milliliter.

*Example 6*

PRODUCTION IN 1900-LITER FERMENTORS WITH A SOYBEAN MEAL, CORN STEEP LIQUOR, YEAST MEDIUM

Inoculum for the seed fermentor is prepared by the aerated bottle procedure as described in Example 5. The entire contents of one of the metal culture bottles are used to inoculate a seed fermentor of 190 liter capacity containing 115 liters of the following medium which is sterilized at 124° C. for one hour and cooled to 32° C.:

| | Grams per liter |
|---|---|
| Starch | 10 |
| Soybean meal | 20 |
| Corn steep liquor (wet weight) | 10 |
| Whole dried brewer's yeast | 5 |
| Calcium carbonate | 3 |
| Trans-esterified vegetable oil | 30 | pH to 6.7 with $Na_2CO_3$.

The seed fermentor is held at 32° C. for 24 hours with vigorous mechanical agitation and aeration at the rate of one volume of air per volume of culture medium per minute. At the end of this 24-hour period the entire contents of the fermentor are used to inoculate 1150 liters of the same medium in a fermentor with a capacity of 1900 liters. The inoculated medium in the fermentor is maintained under vigorous mechanical agitation at a temperature of 32° C. for 4 days. Sterile air for aeration of the culture medium is introduced at the rate of one volume per volume of medium per minute. At the end of the fermentation cycle, the culture is diluted with sufficient water to make it thin enough to pump from the tank in order to begin the recovery operation. Prior to the dilution of the culture, a sample is removed for assay and treated in the manner described in Example 5. The assay on the material in this 1150 liter fermentation is 375 units per ml.

Example 7

PRODUCTION IN 38,000-LITER FERMENTORS WITH A SOYBEAN MEAL, CORN STEEP LIQUOR, YEAST MEDIUM

Inoculum for the seed fermentor is prepared by the aerated bottle procedure as described in Example 5. The entire contents of one of the metal culture bottles are used to inoculate a seed fermentor of 3150 liter capacity containing 1285 liters of the following medium which is sterilized at 124° C. for one hour and cooled to 32° C.:

| | Grams per liter |
|---|---|
| Starch | 10 |
| Soybean meal | 20 |
| Corn steep liquor (wet weight) | 10 |
| Whole dried brewer's yeast | 5 |
| Calcium carbonate | 3 |
| Trans-esterified vegetable oil | 30 | pH to 6.7 with $Na_2CO_3$.

The seed fermentor is held at 32° C. for 28 hours with vigorous mechanical agitation and aeration at the rate of one volume of air per volume of culture medium per minute. At the end of this 28-hour period, the entire contents of the fermentor are used to inoculate 22,000 liters of the same medium in a fermentor with a capacity of 38,000 liters. The inoculated medium in the fermentor is maintained under vigorous mechanical agitation at a temperature of 32° C. for 4 days. Sterile air for aeration of the culture medium is introduced at the rate of one volume per volume of medium per minute. At the end of the fermentation cycle, the culture is diluted with sufficient water to make it fluid enough to pump from the tank in order to begin the recovery operation. Prior to the dilution of the culture, a sample is removed for assay and treated in the manner described in Example 5. The assay on the material in this 22,000 liter fermentation is 360 units per ml.

Example 8

RECOVERY OF THE ANTIMICROBIAL AGENT FROM A 12-LITER FERMENTATION USING A CHLOROFORM EXTRACTION PROCESS

The fermented liquor from a 23 liter fermentor prepared essentially as described in Example 1 is stirred with a filter aid and separated from the solids by suction filtration to yield 7.6 liters of clear filtrate. The latter is extracted three times with chloroform, using 1.5 liters of chloroform for each extraction. After each extraction the mixture is allowed to stand until the phases separate and the chloroform phase is drawn off. The three portions of chloroform are combined and passed over a column packed with an excess of a synthetic magnesium silicate adsorbent. After washing the column with fresh chloroform, the desired substance is eluted by passing over the column a mixture of 10% ethanol-90% chloroform. Using a plate assay against *Bacillus subtilis* it is shown that 30% of the antimicrobial activity of the beer is recovered in the 936 mg. of solids which are obtained by evaporating the ethanol-chloroform solution.

The growth of *Staphylococcus aureus* in broth is prevented by 2 micrograms per milliliter of the above material. When dissolved in acidified methanol or in 0.1 N aqueous hydrochloric acid, its ultraviolet absorption spectrum shows a maximum at 279 millimicrons of magnitude $$E_{1\,cm.}^{1\%} = 240$$

Example 9

RECOVERY OF THE ANTIMICROBIAL AGENT FROM BOTH THE FERMENTATION LIQUOR AND THE FILTER CAKE

The pooled fermentation liquor from eleven 23-liter fermentors produced substantially as in Example 3 using six different carbohydrates is filtered by suction using a filter aid to yield 60 liters of clear filtrate. The filtrate is extracted three times with chloroform, using for each extraction a volume of chloroform equal to about 1/10 of the volume of the aqueous phase. After each extraction the phases are allowed to separate, the chloroform phase is saved, and the emulsion layer, if present, is centrifuged to recover the chloroform. The combined chloroform extracts contain over 80% of the antimicrobial activity of the filtrate. The filter cake is extracted twice with 10 liter portions of 50% aqueous acetone to remove the major portion of the antimicrobial activity.

In the same manner the pooled fermentation liquor from six 23-liter fermentors produced as in Example 2 is filtered to yield 42 liters of clear filtrate which is extracted three times with chloroform as described above. The filter cake is extracted twice with 10 liter portions of 50% aqueous acetone as described above.

The chloroform extracts of the filtrates are combined and evaporated to dryness under vacuum. The dried residue is suspended in 50 ml. of water and extracted several times with 50 ml. portions of ethyl ether. The ether extracts are combined and evaporated to yield 4.37 grams of solids.

The aqueous acetone extracts of the filter cakes are combined and concentrated to 14 liters to remove the acetone. The water solution is extracted three times with 3 to 4 liters of chloroform. The combined chloroform extracts are evaporated to a dried powder and resuspended in 50 ml. of water and extracted several times with 50 ml. portions of ether. The ether extracts yield 6.90 grams of solids.

Since assays on the two dried preparations show them to have similar potencies, 200 to 250 units per mg., and paper chromatograms and toxicities are similar, the two materials are combined for further purification. Each preparation is dissolved in methanol and the solutions are mixed and dried to give 10 grams of solids. Four grams of this combined material are extracted with several portions of acid water, not more acidic than pH 2.0. The combined acid water extract, 180 ml., is extracted with ether and the ether phase discarded. The water phase is adjusted to a slightly alkaline pH and extracted with ether. The ether extract is reduced to 2.0 grams of dry residue assaying 320 units per mg.

Example 10

RECOVERY OF THE ANTIMICROBIAL AGENT FROM 115-LITER FERMENTATIONS USING A CHLOROFORM EXTRACTION PROCEDURE

The fermented whole cultures produced in four 190 liter fermentors in the same manner as Example 5 are pooled to yield 435 liters. The pooled whole culture is adjusted to pH 2.0 with 10% hydrochloric acid and stirred for 30 minutes. The material is filtered to yield 390 liters of filtrate. The filtrate is adjusted to pH 4.0 with 10% sodium hydroxide solution. Three extractions with 1/10 volume chloroform each time are carried out. The two liquid phases are separated in a centrifuge. The chloroform extract is concentrated under reduced pressure to 2,200 ml. Three volumes of pentane are added to the chloroform concentrate and the mixture extracted three times with 1/3 volume of 5% aqueous acetic acid. The solvent layer is discarded. The aqueous acidic layer is concentrated under reduced pressure to about 1/8 of its original volume. Impurities are precipitated by stirring and slowly adjusting the pH to 5.3 with 10% sodium hydroxide solution. A gummy residue forms which is filtered off and discarded. The pH of the clarified solution is adjusted to pH 11 with 10% sodium hydroxide to precipitate the antimicrobial agent, which is collected by filtration and washed thoroughly with distilled water adjusted to pH 9.0. The powder is dried under vacuum at 45° C. Seventy-five grams of antimicrobial agent M-188 are recovered with an assay potency of 300 units per mg.

Example 11

RECOVERY OF THE ANTIMICROBIAL AGENT FROM 115-LITER FERMENTATIONS USING AMYL ACETATE EXTRACTION AT pH 8.4

The fermented whole cultures produced in two 190 liter fermentors substantially as described in Example 5 are pooled to give 225 liters. The pooled whole culture is adjusted to pH 8.4 using a 10% solution of sodium hydroxide. The adjusted culture is extracted with 1/5 volume of amyl acetate. After separation of the amyl acetate layer it is extracted with approximately 1/2 volume of distilled water, held at pH 2.5 with sulfuric acid. The water phase is separated and adjusted to pH 5.5 with 10% sodium hydroxide. This solution containing the antimicrobial product is concentrated to 3 liters under reduced pressure. The concentrate is adjusted to pH 8.5 to 9.0 with sodium hydroxide which precipitates the antimicrobial product. The precipitate is removed by filtration and washed thoroughly with distilled water adjusted to pH 9.0. The precipitate is dried under vacuum at 45° C. Twenty-six grams of antimicrobial agent M–188 are recovered with an assay potency of 435 units per mg.

Example 12

RECOVERY OF THE ANTIMICROBIAL AGENT FROM 115-LITER FERMENTATION USING AN ACID TREATMENT BEFORE THE AMYL ACETATE EXTRACTION AT AN ALKALINE pH

Seventy-eight liters of fermented whole culture produced in one 190 liter fermentor substantially as described in Example 5 are adjusted to pH 2.0 with sulfuric acid. After the culture is held at pH 2.0 and stirred for three hours, it is filtered to remove the mycelium. The filtrate is adjusted to pH 8.3 with 10% sodium hydroxide solution. Amyl acetate at 1/8 volume is added and the mixture stirred for 30 minutes. The two phases are separated in a centrifuge. The water phase which shows substantially no antimicrobial activity is discarded. The amyl acetate is extracted with an approximately 1/40 volume of water maintained at pH 2.5 with sulfuric acid and the phases separated. The water solution is then adjusted to pH 9.5 with sodium hydroxide while agitating vigorously. The slurry is filtered and the cake washed thoroughly with distilled water at approximately pH 9.0. The solids are dried under vacuum at 45° C. to yield 10.5 grams of product assaying 474 units per mg.

Example 13

RECOVERY OF THE ANTIMICROBIAL AGENT FROM 1150-LITER FERMENTATION USING AMYL ACETATE EXTRACTION AT pH 8.4

The fermented whole cultures produced in four 1900 liter fermentors essentially as described in Example 6 are pooled to give 6200 liters of fermentation liquor. The total volume of the culture includes the water required for dilution so the medium can be pumped from the fermentor. The fermented whole culture is adjusted to pH 8.4 with a 10% solution of sodium hydroxide and extracted with 1/5 volume of amyl acetate. The phases are separated and the water phase discarded. The amyl acetate phase is extracted with approximately 1/40 volume of distilled water held at pH 2.5 with sulfuric acid. The water solution of the antimicrobial product is separated and adjusted to pH 9.5 which precipitates the antimicrobial product. The precipitate is separated by filtration and washed thoroughly with distilled water adjusted to approximately pH 9.0. The precipitate is dried in air at 50° C. The antimicrobial product obtained weighs 563 grams with a potency of 325 units per mg.

Example 14

RECOVERY OF THE ANTIMICROBIAL AGENT FROM 22,000-LITER FERMENTATION USING AN ACID TREATMENT BEFORE THE AMYL ACETATE EXTRACTION AT AN ALKALINE pH

Fermented whole culture produced in the manner described in Example 7 is adjusted to pH 2.0 with sulfuric acid and is stirred for three hours to remove the antimicrobial product from the mycelium. The whole culture is filtered and the filtrate is adjusted to pH 8.4 with 10% sodium hydroxide. At this point 26,190 liters of filtrate are obtained. This filtrate is extracted with 1/8 volume of amyl acetate in a liquid-liquid extractor at the rate of 30 gallons per minute. The amyl acetate solution is extracted with 1/40 volume of water maintained at pH 2.0 with sulfuric acid. This water extract is adjusted to pH 9.5 to precipitate the antimicrobial product. The precipitate is separated by filtration and washed thoroughly with distilled water adjusted to approximately pH 9.0. The precipitate is dried in air at 50° C. The antimicrobial product obtained weighs 7.38 kg. with a potency of 482 units per mg.

Example 15

FURTHER PURIFICATION OF THE ANTIMICROBIAL AGENT BY MAGNESIUM SILICATE ELUTION CHROMATOGRAPHY

Seventeen grams of the antimicrobial product assaying 395 units per mg.

$(E_{1\,cm.}^{1\%}$ peak at $278\,m\mu = 236)$ prepared by the method given in Example 11 is dissolved in 100 ml. of chloroform. This solution is applied to a column containing 500 grams of magnesium silicate adsorbent and development is started with 1% ethanol in chloroform. Fractions of 15 ml. are collected and combined on the basis of ultraviolet peaks as follows:

| Fraction | Development solution | U.V. absorption, $E_{1\,cm}^{1\%}$ | Potency in units/mg. | Weight of preparation in grams |
|---|---|---|---|---|
| 1–59 ml | 1% ethanol in chloroform. | 196 | 382 | 0.302 |
| 60–75 ml | do | 217 | 470 | 3.1 |
| 76–90 ml | do | 258 | 532 | 2.6 |
| 91–105 ml | do | 254 | 550 | 2.0 |
| 106–122 ml | do | 254 | 550 | 1.3 |
| 122–132 ml | do | 212 | 430 | 0.60 |
| Column eluate bottom. | 100% ethanol | 234 | 380 | 2.0 |
| Column eluate* top. | do | 189 | 269 | 0.96 |

*The pigmented impurities were largely retained in the top portion of the column.

Example 16

FURTHER PURIFICATION OF THE ANTIMICROBIAL AGENT BY A MAGNESIUM SILICATE COLUMN

Sixty grams of the antimicrobial product assaying 395 units per mg.

$(E_{1\,cm.}^{1\%}$ peak at $278\,m\mu = 236)$ prepared by the method given in Example 11 is dissolved in 200 ml. of chloroform and applied to a 120 gram magnesium silicate column. The column is washed with 1% methanol in chloroform and two fractions are collected as follows:

| Fraction | $E_{1\,cm.}^{1\%}$ at 280 m$\mu$ | Potency in units/mg. | Weight of fraction in grams |
|---|---|---|---|
| A | 237 | 560 | 43.6 |
| B | 225 | 450 | 2.2 |

Example 17

FORMATION OF HYDROCHLORIDE SALT OF M–188

A sample of the free base as obtained in Example 12 is dissolved in dry diethyl ether. Hydrogen chloride gas is bubbled into the ether and the hydrochloride salt precipitates.

In order that the activity of various preparations of antimicrobial agent M–188 could be evaluated, an agar plate assay was employed using *Bacillus subtilis* ATCC–10707 as the test organism and an M–188 preparation containing 320 units per mg. The assay procedure was based on that of Grove, D. C., and Randall, W. A., "Assay Methods of Antibiotics and a Laboratory Manual," Medical Encyclopedia, Inc., 30 E. 60th Street, New York 22, New York (1955), pages 34, 35 and 38. The agar medium was Baltimore Biological Laboratories Streptomycin assay agar with yeast extract, 10 ml. per plate. The test solution was diluted in 1% phosphate buffer pH 6.0 and added to the cups of Labline steel plates produced by Labline, Inc., 3070–82 West Grand Avenue, Chicago 22, Illinois and the plates incubated at 37° C. for 16–17 hours. The range of the assay curve is 2, 4, 6, 8, 16 units per ml. with a 4 unit per ml. value as the reference standard. A 2 gram sample prepared as described in Example 9 was given an assigned potency on a purely arbitrary basis of 320 units per mg. All assays given in the preceding examples are in these comparative terms. On this basis, samples of M–188 which assay 600 units per mg. are highly purified and are approaching maximum potency.

After the organism has been grown for about 4 days and a suitable concentration of the antimicrobial product has been attained in the fermentation liquor, the product can be separated from the cultures by any of several methods. Since the product is almost insoluble in neutral or alkaline water, most of it is in the solid phase. If desired, the culture may be separated by filtration and the liquid processed as hereinafter described, while the solid phase is extracted with an organic solvent such as acetone or an alcohol in which the base is soluble. Alternatively, the fermentation liquor may be acidified and stirred until the antimicrobial substance is dissolved. The culture is then filtered and the liquid phase is processed to recover the desired product.

To recover M–188 from an aqeuous solution obtained as described above, it is convenient to make the solution alkaline and extract the active substance with a water-immiscible solvent. A wide variety of solvents is useful for the extraction but we prefer chloroform or ethyl or amyl acetate. To recover the M–188 from an organic solvent solution, one may evaporate the solution to dryness, but it is convenient to extract the antimicrobial substance into dilute aqueous acid, using enough acid to neutralize the free base contained in the organic solvent and bring it into solution in a relatively small volume of water, about 1% of the original culture volume. Upon adding alkali such as sodium hydroxide solution to the solution thus obtained, the desired substance is precipitated as the free base. The free base may be purified further by chromatography although it is thus impractical to obtain a completely homogeneous substance. By passing a chloroform solution of M–188 base over a column of magnesium silicate and eluting the active substance with chloroform containing about 1% ethanol, a fractionation of the material is obtained which can be followed by observing the optical density at 280 millimicrons.

Streptomyces caelestis strain M–188 produces a mixture of antimicrobial substances. The best preparations contain more than one biologically active material as revealed by paper chromatograms. Two of the biologically active substances which are present as impurities in the best preparations of antimicrobial agent M–188 have been obtained as purified preparations and their antibacterial properties have been found to be essentially identical to those of the main component. Thus, it is to be strictly understood that the antimicrobial agent as herein described need not be 100% pure in order to be 100% active.

Antimicrobial agent M–188 in its purified state is an amorphous white powder which is soluble in water at 25° C. only to the extent of 2.5 mg./ml. It is very soluble in most organic solvents such as methanol, ethanol, chloroform, ethyl acetate, and benzene. It is insoluble in saturated hydrocarbons. It is readily soluble in dilute aqueous mineral acids. Electrometric titration in 50% aqueous ethanol shows one titratable group of pKa=6.7. The ultraviolet absorption spectrum of the free base in chloroform shows a maximum at 179 millimicrons of $$E_{1\,cm.}^{1\%} = 280$$

and a minimum at 232 millimicrons of $$E_{1\,cm.}^{1\%} = 29$$

The infrared absorption spectrum of purified M–188 is shown in the accompanying drawing. When an infrared spectrum of antimicrobial agent M–188 as the free base is determined with a 7% chloroform solution using a double beam spectrophotometer, the following absorption bands are seen:

| Wavelength in microns | Frequency in reciprocal centimeters | Intensity |
| --- | --- | --- |
| 2.88 | 3472 | M |
| 3.41 | 2933 | S |
| 5.79 | 1727 | S |
| 5.94 | 1684 | W |
| 6.12 | 1634 | W |
| 6.26 | 1597 | S |
| 6.89 | 1451 | M |
| 7.11 | 1406 | W |
| 7.36 | 1359 | W |
| 7.46 | 1340 | W |
| 7.73 | 1294 | W |
| 7.85 | 1274 | W |
| 8.00 | 1250 | W |
| 8.60 | 1163 | S |
| 8.95 | 1117 | M |
| 9.25 | 1081 | M |
| 9.52 | 1050 | M |
| 9.75 | 1026 | M |
| 9.85 | 1015 | M |
| 9.98 | 1002 | M |
| 10.22 | 978 | M |
| 10.9 | 917 | W |
| 11.12 | 899 | W |
| 11.53 | 868 | W |
| 11.94 | 838 | M |

S=Strong; M=Medium; W=Weak.

The specific rotation of a 1% solution of the free base in chloroform is $[\alpha]_D^{25} = -40$.

The elemental analysis of a representative sample of the free base of M–188 shows that it contains 60.37% carbon, 8.21% hydrogen, 1.91% nitrogen and 29.51% oxygen by difference which corresponds to an empirical formula of $C_{38}H_{61}NO_{14}$ which theoretically contains 60.38% carbon, 8.13% hydrogen, 1.85% nitrogen and 29.63% oxygen. Thus, the calculated molecular weight is 756.

The acid-addition salts of antimicrobial agent M–188 can be obtained by treating a solution of the free base in water or an organic solvent such as methanol, ethyl acetate or methylene chloride with an equivalent amount of an aqueous solution of an acid such as hydrogen chloride, oxalic acid, salicylic acid or citric acid and evaporating the solution to dryness. Alternatively, a solution of antimicrobial agent M–188 in an organic solvent can be treated with a selected acid or a solution thereof, and the corresponding acid-addition salt precipitated directly from the solution. Illustrative examples of such salts are the hydrochloride, oxalate, salicylate, citrate, benzoate and sulfate. For therapeutic purposes, the salt chosen should obviously be non-toxic.

The invention is not to be limited to the production of antimicrobial agent M–188 by the described strain of Streptomyces caelestis. It is to be understood that the fermentative processes of this invention also embrace other antimicrobial agent M–188 producing strains of Streptomyces caelestis produced by exposure of the described organism to modifying means such as X-ray, ultraviolet light and chemical agents such as, for example, nitrogen mustards.

Antimicrobial agent M–188 and its acid-addition salts are characterized by a broad antibacterial spectrum. The activity of said agent against illustrative organisms is shown in the following table:

ANTIMICROBIAL SPECTRUM

| Organism: | Minimum inhibitory concentration after 48 hours in mcg./ml. |
|---|---|
| Staphylococcus aureus 209-P | .5 |
| Staphylococcus aureus Treaster | .5 |
| Staphylococcus aureus Wise 391 | 1 |
| Staphylococcus albus | .75 |
| Streptococcus pyogenes | .25 |
| Streptococcus faecalis | 2 |
| Streptococcus agalactiae | .13 |
| Streptococcus dysgalactiae | .25 |
| Enterococcus 89 | 2 |
| Enterococcus 93 | 2 |
| Enterococcus Blaschke | 1 |
| Clostridium sporogenes | 48 |
| Clostridium perfringens | 64 |
| Corynebacterium species | .25 |
| Sarcina lutea | .06 |
| Diplococcus pneumoniae | .25 |
| Lactobacillus casei | .5 |
| Salmonella enteritidis | >256 |
| Aerobacter aerogenes | >256 |
| Escherichia coli | 128 |
| Klebsiella pneumonia | 4 |
| Pasteurella multocida ATCC 10544 | 4 |
| Pasteurella multocida (chicken) | 4 |
| Shigella sonnei | 96 |
| Neisseria catarrhalis | 2 |
| Actinomyces bovis | 5 |
| Aspergillus niger | >512 |
| Chaetomium globosum | >512 |
| Saccharomyces cerevisiae | <32 |
| Candida albicans | >512 |

Antimicrobial agent M-188 has been found to be extremely useful in controlling turkey sinusitis and coccidiosis. In representative operations, good control of infectious sinusitis in turkeys resulted when 25 to 50 mg. of antimicrobial agent M-188 was injected directly into the sinuses of the infected turkeys. In like manner, it has been found that when antimicrobial agent M-188 is incorporated into the feed of chickens at a concentration of from 0.05% by weight to 0.10% by weight of the total feed composition and fed to chickens heavily infested with coccidiosis due to the presence of the protozoan organism *Eimeria tenella*, good control of coccidiosis resulted. M-188 has not yet been proven useful in human therapy.

What we claim is:

1. A method of producing an antimicrobial substance designated as antimicrobial agent M-188 which comprises cultivating under aerobic conditions *Streptomyces caelestis* NRRL 2821 in a culture medium containing assimilable sources of carbohydrate, nitrogen and inorganic salts until substantial antimicrobial activity is produced by said organism in said culture medium.

2. A method of producing antimicrobial agent M-188 which comprises cultivating under submerged aerobic conditions *Sterptomyces caelestis* NRRL 2821 in a culture medium containing assimilable sources of carbohydrate, nitrogen and inorganic salts until substantial antimicrobial activity is produced by said organism in said culture medium, and recovering the antimicrobial agent M-188 from said culture medium.

3. A method as claimed in claim 2 which includes the step of extracting the culture broth at a pH between about 3 and 10 with a water-immiscible, polar, organic solvent.

4. A method as claimed in claim 2 in which the culture medium is maintained at a temperature between about 20° C. and about 32° C. and the growth of the organism is carried out for a period of from 2 to 6 days.

References Cited by the Examiner

Murri: Antibiotics and Chemotherapy, August 1959, pp. 485–490.

Pridham et al.: Applied Microbiology, January 1958, p. 64.

JULIAN S. LEVITT, *Primary Examiner.*

SAM ROSEN, MORRIS O. WOLK, WILLIAM B. KNIGHT, *Examiners.*

UNITED STATES PATENT OFFICE
CERTIFICATE OF CORRECTION

Patent No. 3,218,239                      November 16, 1965

Earl E. Fager et al.

It is hereby certified that error appears in the above numbered patent requiring correction and that the said Letters Patent should read as corrected below.

Column 8, lines 12 and 43, and column 9, line 32, for "aspetically", each occurrence, read -- aseptically --; column 16, line 2, for "179" read -- 279 --.

Signed and sealed this 4th day of October 1966.

(SEAL)
Attest:

ERNEST W. SWIDER                    EDWARD J. BRENNER
Attesting Officer                     Commissioner of Patents